US010421886B2

(12) United States Patent
Sustic et al.

(10) Patent No.: US 10,421,886 B2
(45) Date of Patent: Sep. 24, 2019

(54) LOW MOLECULAR WEIGHT BUTENE-1-CO-HEXENE-1 AMORPHOUS POLY ALPHA OLEFINS FOR HOT MELT ADHESIVES WITH ENHANCED PROPERTIES

(71) Applicants: Andres Sustic, Odessa, TX (US); Nick Fowler, Odessa, TX (US); John Passmore, Odessa, TX (US)

(72) Inventors: Andres Sustic, Odessa, TX (US); Nick Fowler, Odessa, TX (US); John Passmore, Odessa, TX (US)

( * ) Notice: Subject to any disclaimer, the term of this patent is extended or adjusted under 35 U.S.C. 154(b) by 0 days.

(21) Appl. No.: 16/153,895

(22) Filed: Oct. 8, 2018

(65) Prior Publication Data
US 2019/0071592 A1    Mar. 7, 2019

Related U.S. Application Data

(63) Continuation of application No. 15/486,115, filed on Apr. 12, 2017, and a continuation of application No. 16/111,494, filed on Aug. 24, 2018.

(60) Provisional application No. 62/321,663, filed on Apr. 12, 2016, provisional application No. 62/558,670, filed on Sep. 14, 2017.

(51) Int. Cl.
*C09J 123/14* (2006.01)
*C08J 3/00* (2006.01)

(52) U.S. Cl.
CPC .............. *C09J 123/14* (2013.01); *C08J 3/00* (2013.01)

(58) Field of Classification Search
CPC ...... C09J 123/14; C09J 123/20; C09J 123/06; C09J 11/06; C09J 2205/114; C09J 2423/00; C09J 2453/00; C09J 2423/10; C08J 3/00
See application file for complete search history.

(56) References Cited

U.S. PATENT DOCUMENTS

| 6,586,536 B1 * | 7/2003 | Kelley | C08F 210/06 526/124.2 |
| 9,982,098 B2 * | 5/2018 | Sustic | C08J 3/005 |
| 2012/0302716 A1 * | 11/2012 | Kobayashi | C08F 10/06 526/351 |
| 2014/0079919 A1 * | 3/2014 | Bunnelle | C09J 123/18 428/195.1 |
| 2015/0148473 A1 * | 5/2015 | Sustic | C09J 123/08 524/505 |

* cited by examiner

*Primary Examiner* — Patrick D Niland
(74) *Attorney, Agent, or Firm* — Nolte Intellectual Property Law Group

(57) ABSTRACT

A hot-melt adjuvant-free formulation includes a butene-1-co-hexene-1 copolymer formed from butene-1 and hexene-1 monomers with a supported Ziegler-Natta catalyst, a styrenic block copolymer with less than 15 percent styrene, a high melt flow index metallocene, a high melt flow rate polypropylene with a melt flow above 18000 cps, and a low molecular weight polyethylene wax, wherein the molecular weight is less than 1000 centipoise at a temperature of 350 degrees Fahrenheit.

16 Claims, 2 Drawing Sheets

TABLE 1.

| Example # | Butene-1, mL | Hexene-1, mL | Butene-1, wt% | Hexene-1, wt% | Hydrogen, psi | F2/F3 |
|---|---|---|---|---|---|---|
| 1 | 375 | 325 | 53.6 | 46.4 | 85 | 250 |
| 2 | 375 | 325 | 53.6 | 46.4 | 85 | 250 |
| 3 | 375 | 325 | 53.6 | 46.4 | 85 | 250 |
| 4 | 500 | 200 | 71.4 | 28.6 | 120 | 400 |
| 5 | 500 | 200 | 71.4 | 28.6 | 50 | 100 |
| 6 | 500 | 200 | 71.4 | 28.6 | 50 | 400 |
| 7 | 250 | 450 | 55.6 | 44.4 | 50 | 400 |
| 8 | 500 | 200 | 71.4 | 28.6 | 50 | 400 |
| 9 | 500 | 200 | 71.4 | 28.6 | 120 | 400 |
| 10 | 250 | 450 | 35.7 | 64.3 | 120 | 400 |
| 11 | 375 | 325 | 53.6 | 46.4 | 85 | 250 |
| 12 | 500 | 200 | 71.4 | 28.6 | 120 | 100 |
| 13 | 250 | 450 | 35.7 | 64.3 | 50 | 100 |
| 14 | 250 | 450 | 35.7 | 64.3 | 50 | 100 |
| 15 | 250 | 450 | 35.7 | 64.3 | 120 | 100 |
| 16 | 250 | 450 | 35.7 | 64.3 | 120 | 400 |
| 17 | 375 | 325 | 53.6 | 46.4 | 85 | 250 |
| 18 | 500 | 200 | 71.4 | 28.6 | 120 | 100 |
| 19 | 250 | 450 | 35.7 | 64.3 | 120 | 100 |
| 20 | 250 | 450 | 35.7 | 64.3 | 50 | 400 |
| 21 | 375 | 325 | 53.6 | 46.4 | 85 | 250 |
| 22 | 375 | 325 | 53.6 | 46.4 | 85 | 250 |
| 23 | 500 | 200 | 71.4 | 28.6 | 50 | 100 |

FIG 1

TABLE 2.

| Example # | MV, cps | NP, dmm | RBSP, F | RBT, cm | Loop Tack Test LBF-FT/1"² 12"/min | HoPo, min 500g Wt. 80°F | HoPo, min 1000g Wt. 80°F | HoPo, min 500g Wt. 40°C | HoPo, min 1000g Wt. 40°C |
|---|---|---|---|---|---|---|---|---|---|
| 1 | 3270 | 203 | 102 | 4.0 ± 0.5 | 8.6 ± 1.5 | 2.6 ± 0.2 | 1.2 ± <1 | 0.8 ± 0.3 | 0.2 ± 0.1 |
| 2 | 3965 | 213 | 113 | 3.0 ± 0.4 | 8.5 ± 0.9 | 3.2 ± 0.5 | 1.8 ± 0.1 | 0.8 ± 0.2 | 0.5 ± 0.2 |
| 3 | 2990 | 235 | 111 | 3.1 ± 0.5 | 7.8 ± 1.3 | 2.9 ± 0.3 | 1.5 ± 0.1 | 1.0 ± 0.1 | 0.6 ± 0.1 |
| 4 | 785 | 126 | 231 | 2.1 ± 0.2 | 7.7 ± 0.1 | 16 ± 2 | 6.2 ± 0.7 | 3.6 ± 0.2 | 1.4 ± 0.1 |
| 5 | 4625 | 72 | 152 | 4.3 ± 0.9 | 8.5 ± 1.0 | 57 ± 15 | 19 ± 1 | 8.4 ± 0.6 | 2.4 ± 0.1 |
| 6 | 10980 | 100 | 161 | 5.8 ± 0.2 | 9.9 ± 0.5 | >5hrs. | 59 ± 3 | 11 ± 0.9 | 3.5 ± 0.1 |
| 7 | 15680 | 145 | 156 | 4.1 ± 0.5 | 9.0 ± 0.5 | 6.6 ± 0.4 | 2.8 ± 0.1 | 2.1 ± 0.1 | 0.9 ± 0.1 |
| 8 | 7488 | 99 | 160 | 4.5 ± 0.3 | 9.4 ± 0.4 | >5hrs. | 94 ± 11 | 17 ± 0.8 | 5.2 ± 0.3 |
| 9 | 1037 | 219 | 131 | 2.9 ± 0.4 | 10.9 ± 1.8 | 18 ± 0.4 | 6.0 ± 0.6 | 1.9 ± 0.1 | 0.5 ± 0.1 |
| 10 | 3135 | 276 | 93 | 2.5 ± 0.4 | 6.4 ± 0.8 | 1.6 ± 0.3 | 1.1 ± <0.1 | 0.4 ± 0.1 | 0.2 ± 0.1 |
| 11 | 3255 | 202 | 131 | 2.8 ± 0.4 | 7.6 ± 1.1 | 4.6 ± 0.5 | 2.1 ± 0.3 | 1.2 ± 0.1 | 0.4 ± 0.1 |
| 12 | 1638 | 50 | 134 | 2.3 ± 0.2 | 6.7 ± 0.2 | >12hrs. | 96 ± 4 | 7.9 ± 0.8 | 2.3 ± 0.1 |
| 13 | 13100 | 140 | 152 | 3.2 ± 0.5 | 8.6 ± 0.6 | 8.7 ± 0.3 | 3.4 ± 0.3 | 1.9 ± 0.2 | 0.8 ± 0.1 |
| 14 | 14350 | 147 | 152 | 3.2 ± 0.2 | 6.6 ± 0.8 | 8.1 ± <0.1 | 2.2 ± 0.1 | 3.2 ± 0.3 | 0.9 ± 0.1 |
| 15 | 3015 | 257 | 113 | 2.7 ± 0.4 | 7.5 ± 1.1 | 2.1 ± 0.1 | 1.0 ± 0.1 | 0.7 ± 0.1 | 0.2 ± 0.1 |
| 16 | 2535 | 282 | 94 | 3.3 ± 0.4 | 8.6 ± 0.5 | 2.5 ± 0.2 | 1.3 ± 0.2 | 1.0 ± 0.2 | 0.4 ± <0.1 |
| 17 | 4775 | 200 | 123 | 4.2 ± 0.3 | 8.6 ± 0.4 | 3.4 ± 0.3 | 1.6 ± 0.1 | 0.8 ± 0.1 | 0.2 ± 0.1 |
| 18 | 1518 | 192 | 140 | 3.0 ± 0.6 | 9.1 ± 1.0 | 74 ± 6 | 26 ± 1 | 3.9 ± 0.2 | 1.0 ± <0.1 |
| 19 | 5263 | 215 | 128 | 2.5 ± 0.4 | 9.2 ± 0.6 | 3.5 ± 0.3 | 1.1 ± 0.1 | 1.6 ± 0.2 | 0.5 ± 0.1 |
| 20 | 10600 | 144 | 151 | 1.4 ± 0.2 | 8.2 ± 0.7 | 7.3 ± 0.4 | 2.9 ± 0.2 | 2.1 ± 0.5 | 0.9 ± 0.2 |
| 21 | 3695 | 232 | 110 | 1.7 ± 0.3 | 8.3 ± 0.8 | 3.0 ± 0.3 | 1.4 ± 0.1 | 0.7 ± 0.2 | 0.5 ± 0.2 |
| 22 | 6575 | 158 | 152 | 1.3 ± 0.2 | 8.3 ± 0.6 | 7.4 ± 0.3 | 3.0 ± 0.1 | 1.4 ± 0.2 | 0.6 ± <0.1 |
| 23 | 7075 | 32 | 160 | 1.5 ± 0.5 | 6.5 ± 0.6 | >24 | >24 | >24 | 145 ± 10 |

FIG 2

LOW MOLECULAR WEIGHT BUTENE-1-CO-HEXENE-1 AMORPHOUS POLY ALPHA OLEFINS FOR HOT MELT ADHESIVES WITH ENHANCED PROPERTIES

CROSS-REFERENCE TO RELATED APPLICATIONS

The present application is a continuation of U.S. patent application Ser. No. 15/486,115 filed on Apr. 12, 2017, which claims priority to U.S. Provisional Patent Application Ser. No. 62/321,663, filed on Apr. 12, 2017; and a continuation of U.S. patent application Ser. No. 16/111,494 filed on Aug. 24, 2018, which claims priority to U.S. Provisional Patent Application Ser. No. 62/558,670. These references are hereby incorporated in their entirety.

FIELD

The present embodiment generally relates to low molecular weight amorphous butene-1-co-hexene-1 poly alpha olefins (ABH copolymers) for hot melt adhesives.

BACKGROUND

A need exists for low molecular weight ABH copolymers for hot melt adhesives to provide improved mixing, and lower temperature processing, conserving energy for processing.

The present embodiments meet these needs.

BRIEF DESCRIPTION OF THE DRAWINGS

The detailed description will be better understood in conjunction with the accompanying drawings as follows:

FIG. 1 depicts a table providing volumes and percentages of components of ABH copolymers FIG. 2 depicts a table of physical and mechanical properties of the ABH copolymers from the table of FIG. 1.

The present embodiments are detailed below with reference to the listed Figures.

DETAILED DESCRIPTION OF THE EMBODIMENTS

Before explaining the present formulation in detail, it is to be understood that the formulations are not limited to the particular embodiments and can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present invention generally relates to formulations suitable for use as hot-melt adhesives and pressure-sensitive adhesives. More particularly, the invention relates to amorphous poly alpha olefin (APAO) adhesives.

Amorphous poly-alpha-olefins (APAO) are produced by the (co-) polymerization of α-olefins, e.g. propylene or 1-butene with Ziegler-Natta catalysts. The (co-) polymers have an amorphous structure which makes them useful for the production of hot melt adhesives.

U.S. Pat. No. 5,302,675, "High Tensile Strength Amorphous 1-Butene/Propylene Copolymers," describes a process for the production of propylene/1-butene copolymers comprising: reacting propylene and 1-butene monomers in the presence of a catalyst system comprising: (a) a solid supported catalyst component may be prepared by the method comprising: (i) co-comminuting magnesium halide support base and aluminum trihalide in a molar ratio from about 8:0.5 to about 8:3 in the absence of added electron donor; and (ii) then co-comminuting the product of step (i) in the absence of added electron donor with sufficient titanium tetrahalide to provide a molar ratio of magnesium halide to titanium tetrahalide from about 8:0.1 to about 8:1.0; (b) a trialkylaluminum co-catalyst, having from 1 to 9 carbon atoms in each alkyl group in an amount such that the Al/Ti ratio may be between about 50:1 and about 500:1; (c) an alkoxy silane component of the formula Rn Si(OR') 4-n where n=1-3, R=aryl or alkyl and R'=C1-3 alkyl in a sufficient quantity such that the molar ratio of organoaluminum co-catalyst to alkoxy silane may be in the range from about 20:1 to about 45:1, said copolymer being characterized by a propylene content of 25 to 50 weight percent, a 1-butene content of 75 to 50 weight percent and a tensile strength of at least 300 psig.

U.S. Pat. Nos. 5,681,913, 5,637,665, and 5,714,554 each entitled "High Tensile Strength Amorphous 1-Butene/Propylene and Ethylene/Propylene Copolymers," describe amorphous propylene/1-butene and ethylene/propylene copolymers having increased tensile properties produced by the process comprising: reacting propylene and 1-butene monomers or ethylene and propylene monomers in the presence of a catalyst system comprising: (a) a solid supported catalyst component may be prepared by the method comprising: (i) co-comminuting magnesium halide support base and aluminum tri-halide in a molar ratio from about 8:0.5 to about 8:3 in the absence of added electron donor; and (ii) then co-comminuting the product of step (i) in the absence of added electron donor with sufficient titanium tetra-halide to provide a molar ratio of magnesium halide to titanium tetrahalide from about 8:0.1 to about 8:1.0; (b) a trialkylaluminum co-catalyst, having from 1 to 9 carbon atoms in each alkyl group in an amount such that the Al/Ti ratio is between about 50:1 and about 500:1; and (c) an alkoxy silane component of the formula Rn Si(OR')4-n where n=1-3, R=aryl or alkyl and R'=C1-3 alkyl.

U.S. Pat. No. 6,586,543, "Process for the Preparation of Substantially Amorphous Poly-alpha-olefins," describes a process for preparing a substantially amorphous poly-α-olefin, which includes: a) preforming a solid catalyst and, optionally, a first amount of a tri alkyl aluminum cocatalyst, by contacting the catalyst and optionally the cocatalyst with at least one selected from the group including oxygen and a compound which includes active oxygen, to form a preformed catalyst, wherein the solid catalyst includes magnesium, aluminum and titanium, and wherein said trialkyl aluminum cocatalyst includes 1 to 9 carbon atoms in each alkyl group; b) contacting the preformed catalyst with a second amount of the cocatalyst, wherein a molar ratio of trialkylaluminum to the titanium ranges from 40:1 to 700:1, to form a catalyst mixture; c) polymerizing, in the liquid phase, with the catalyst mixture, an olefin or an olefin mixture at a temperature between 30 and 160° C., to produce the poly-α-olefin.

U.S. Pat. No. 4,309,522, "Process for the production of extensively amorphous butene-1-propene-ethene copolymers having a high softening point," describes a process for preparing an extensively amorphous butene-1-propene-ethene terpolymer having a high softening point that comprises low pressure solution polymerizing butene-1, propene and ethene by contacting these monomers with a catalytically effective amount of a mixed catalyst of a thermally unstable crystalline TiCl3.0.30 to 0.35 AlCl3 and a trialkyl aluminum or dialkyl aluminum hydride, each having alkyl groups of 2-4 carbon atoms, the atomic ratio of Al:Ti being 0.8-4.0.

U.S. Pat. No. 4,322,514, "Process for preparing a copolymer," describes a process for preparing a non- or low-crystalline soft copolymer, characterized in that 50 to 98 mole percent of propylene, 0.2 to 30 mole percent of ethylene and 0.2 to 45 mole percent of a straight-chained α-olefin having not less than four carbon atoms are copolymerized using a catalyst, said catalyst comprising (1) a solid substance containing magnesium and titanium and (2) an organometallic compound.

U.S. Pat. No. 4,826,939, "Highly amorphous olefin terpolymer," describes highly amorphous olefin copolymers from propylene, 1-hexene, and ethylene in which the ethylene units are incorporated in the polymer chain in a highly random manner, and a process for producing such copolymers.

U.S. Pat. No. 4,847,340, "Novel propylene polymerization process", describes a process for the production of substantially amorphous copolymers consisting essentially of ethylene and propylene which comprises reacting from about 70 to about 96.5 weight percent propylene and from about 3.5 to about 30 weight percent ethylene at a temperature between about 130 degree F. and about 175 degree F. and at a reactor pressure sufficient to maintain butene-1 in the liquid phase, in the presence of from about 0.7 to about 3.0 mol percent hydrogen based on the monomer feed to the process and employing as catalyst a composition of: (a) a solid catalyst component produced by the method comprising: (i) co-communicating magnesium halide support base and aluminum trihalide in a molar ratio from about 8:0.5 to about 8:3 in the absence of added electron donor and (ii) then co-comminuting the product of step (i) in the absence of added electron donor with sufficient titanium tetrahalide to provide a molar ratio of magnesium halide to titanium tetrahalide from about 8:0.4 to about 8:1.

U.S. Pat. No. 3,954,697, "Poly(higher-1-olefin-co-propylene) copolymers as hot-melt, pressure-sensitive adhesives" describes a hot melt, pressure sensitive adhesive comprising an amorphous propylene/higher 1-olefin copolymer containing 40 to 60 mole percent higher 1-olefin having a melt viscosity range at 190.degree. C. of 10,000 cp. to 75,000 cp., a density of 0.85 to 0.86, a glass transition temperature of −30.degree. to −45.degree. C., and having no melting point measurable by Differential Scanning Calorimetry, wherein said higher 1-olefin is a member of the group consisting of 1-hexene, 1-heptene, 1-octene, 1-nonene and 1-decene.

U.S. Pat. No. 4,072,812, "Poly(higher-1-olefin/butene-1) copolymers as hot-melt pressure-sensitive adhesives", describes a hot melt, pressure sensitive adhesive comprising an amorphous propylene/higher 1-olefin in copolymer containing 40 to 60 mole percent higher 1-olefin having a melt viscosity range at 190 degree. C. of 10,000 cp. to 75,000 cp., a density of 0.85 to 0.86, a glass transition temperature of −30.degree. to −45.degree. C., and having no melting point measurable by Differential Scanning Calorimetry, wherein said higher 1-olefin is at least two members of the group consisting of 1-hexene, 1-heptene, 1-octene, 1-nonene and 1-decene.

U.S. Pat. No. 4,169,116, "Blends of substantially amorphous olefin copolymers and compatible tackifying resins useful as hot-melt, pressure-sensitive adhesives", describes an adhesive composition capable of being used as a hot-melt, pressure-sensitive adhesive comprising a blend of (1) about 95 to 50 weight percent of a substantially amorphous olefin copolymer containing at least one C.sub.3 to C.sub.5 linear alpha-olefin and 40 to 60 mole percent of at least one higher alpha-olefin of 6 to 10 carbon atoms, said copolymer having a melt viscosity of >76,000 to 1,000,000 centipoise at 190.degree. C., and (2) 5 to 50 weight percent of at least one compatible tackifying resin.

U.S. Pat. No. 4,210,570, "Blends of substantially amorphous olefin copolymers, compatible tackifying resins and plasticizing oils useful as hot melt, pressure-sensitive adhesives", describes an adhesive composition capable of being used as a hot-melt, pressure-sensitive adhesive comprising a blend of (1) about 98 to 25 weight percent of a substantially amorphous or semicrystalline olefin copolymer containing at least one C.sub.3 to C.sub.5 linear alpha-olefin and 15 to 60 mole percent of at least one higher linear alpha-olefin of 6 to 10 carbon atoms, said copolymer having a melt viscosity of 5,000 to 1,000,000 centipoise at 190.degree. C., (2) 1 to 60 weight percent of at least one compatible tackifying resin, and (3) 1 to 25 weight percent plasticizing oil.

U.S. Pat. No. 4,288,358, "Blends of propylene/1-butene or 1-pentene/higher olefin copolymers, compatible tackifying resins and plasticizing oils useful as hot-melt, pressure-sensitive adhesives", describes an adhesive composition capable of being used as a hot-melt, pressure-sensitive adhesive comprising a blend of (1) about 98 to 25 weight percent of an olefin copolymer containing 10-65 mole percent propylene, 15-75 mole percent of either 1-butene or 1-pentene and 3 to 14 mole percent of at least one higher linear alpha-olefin of 6 to 10 carbon atoms, said copolymer having a melt viscosity of 10,000 to 1,000,000 centipoise at 190.degree. C., (2) 1 to 60 weight percent of at least one compatible tackifying resin, and (3) 1 to 25 weight percent plasticizing oil.

U.S. Pat. No. 4,825,939, "Highly amorphous olefin terpolymer", describes an amorphous, pressure-sensitive terpolymer comprising repeating units from about 0.1 to about 10 percent by weight ethylene, from about 30 to about 78 percent by weight propylene, and from 20 to 70 percent by weight 1-hexene, the terpolymer having a ring and ball softening point of from about 75.degree. C. to about 120.degree. C., a melt viscosity of from about 1.00 to about 100,000 cp at 190.degree. C., no DSC melting point, and a 180.degree. peel strength of at least about 11 pounds/inch, 2). The amorphous terpolymer of claim 1 having a melt viscosity of from about 1,000 to about 20,000 cps at 190.degree. C., and a softening point of from about 80.degree. C. to about 115.degree. C. 3). A process for producing an amorphous, pressure-sensitive terpolymer having no DSC melting point comprising continuously polymerizing a mixture of from about 0.1 to about 10 percent by weight ethylene, from about 30 to about 78 percent by weight propylene, and from about 20 to about 70 percent by weight 1-hexene in the presence of a catalyst comprising an anionic coordination catalyst and in a solvent medium, at a temperature of from about 140.degrees C. to about 250.degrees C. and at a pressure of about 100 to about 5,000 pounds per square inch gauge.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The following definitions are used herein:

The term "adjuvant" refers to a component not used in this invention, including but not limited to tackifiers and plasticizers.

The term "amorphous butene-1-co-hexene-1 polymer component" can include long chains of butene-1 and hexene-1 monomers assembled together in a random order which inhibits the formation of crystalline structures or crystalline order.

The term "hot melt adhesive formulation" can refer to a thermoplastic material that is used neat unformulated or is blended, or formulated, with other materials to make a formulation with a broader use of application spectrum.

The term "hexene-1 co-monomer" refers to one of eighteen hexene isomers in which the double bond is in the primary alpha carbon atom.

The term "butene-1 co-monomer" refers to one of four butene isomers in which the double bond is in the primary alpha carbon atom.

Butene-1-co-hexene-1 copolymers are made using a supported Ziegler-Natta catalyst system either with or without an in-reactor added organosilicon external donor.

Copolymers made according to this invention may be used in the formulation of improved-performance APAO-based hot melt adhesives.

Due to the compositional nature of butene-1-co-hexene-1 copolymer APAOs, each of the two co-monomers, namely hexene-1, and butene-1, adds a unique set of properties to the APAO, which may be enhanced, or changed, by the addition of an external organosilicon donor.

The use of these APAO copolymers may add unique properties when used as components in hot melt adhesive formulations such as those used preferentially pressure sensitive adhesives and also in such applications as in personal hygiene (e.g., diapers, feminine hygiene, elastic attachment, etc.), in assembly, construction, lamination, footwear and other applications that require such properties as permanent tackiness, controllable open time, low temperature flexibility, good temperature resistance and other such desirable properties.

Amorphous poly alpha olefins are produced by the (co-)polymerization of α-olefins, for example, ethylene (CAS#74-85-1, wherein CAS refers to the Chemical Abstract Service), propylene (CAS#115-07-1), butene-1 (CAS#106-98-9) or hexene-1 (CAS#592-41-4 with Ziegler-Natta catalysts. The (co)-polymers have an amorphous structure which makes them useful for the production of hot melt adhesives.

Examples of APAOs include for example, amorphous (also known as atactic) poly propylene (APP, CAS#9003-07-0), amorphous poly propylene-co-ethylene (APE, CAS#9010-79-1), amorphous poly propylene-co-butene-1 (APB, CAS#29160-13-2), amorphous poly propylene-co-hexene-1 (APH, CAS#25895-44-7), amorphous poly butene-1-co-hexene-1 (ABH) copolymers, amorphous poly propylene-co-ethylene-co-butene-1 (APEB, CAS#25895-47-0), amorphous poly ethylene-co-1-butene-co-1-hexene (AEBH, CAS #60785-11-7) and amorphous poly propylene-co-butene-1-co-hexene-1 (APBH) copolymers.

For the polymers noted above, APP is harder than APE, which is generally harder than APB, which is generally harder than APH, and which is generally harder than ABH, in accordance with decreasing crystallinity. And in accordance to their decreasing crystallinity, APP has higher tensile or mechanical strength than APE, which has generally higher tensile or mechanical strength than APB, which has generally higher tensile or mechanical strength than APH and ABH.

Due to the amorphous nature and lower molecular weights of APAOs than other polymers, polymers such as styrene block copolymers (SBCs), or other metallocene polyethylenes and polypropylenes, can be processed into the starting copolymers at lower temperatures, such as at application temperatures of 375 degrees Fahrenheit.

APAOs exhibit a high degree of substrate wetting which is a very desirable HMA property. However, APAOs show relatively low cohesion, the entangled polymer chains having a fairly high degree of freedom of movement. Under mechanical load, most of the strain is dissipated by elongation and disentanglement of polymer chains, and only a small fraction reaches the adhesive-substrate interface. Cohesive failure rather than adhesive failure is therefore a more common failure mode of APAOs. The addition of other polymers, such as styrene block copolymers (SBCs) or metallocene polyethylenes and polypropylenes, can improve the cohesive strength of APAOs.

Amorphous hexene-1 containing poly alpha olefins can be produced in a continuously stirred tank reactor (CSTR) at an extended temperature range using a primary reaction catalyst. In some instances, the primary reaction catalyst can be a transition metal Ziegler-Natta catalyst, and a co-catalyst.

In some instances, the primary reaction catalyst can be a metallocene-based catalyst. In other instances, the primary reaction catalyst can be a late transition metal supported catalyst, known in the art as a Ziegler-Natta catalyst.

In some instances, the amorphous butene-1-co-hexene-1 containing poly alpha olefins can be produced in the reactor vessel from a liquid pool of monomers.

In other instances, the amorphous butene-1-co-hexene-1 containing polyolefins can be produced in the reactor vessel from a liquid pool of monomers and non-reactive alkanes such as, for example, butane, pentane, hexane, heptane, octane, decane and dodecane.

In some instances, the co-catalyst can be an organo-aluminum compound such as for example, trimethylaluminum (TMA, CAS#75-24-1), triethylaluminum (TEA, CAS#97-93-8), diethylaluminum chloride (DEAC, CAS#96-10-6), and triisobutylaluminum, (TiBAl, CAS#100-99-2).

A hot melt adhesive (HMA) according to the present invention may be made up using a butene-1-co-hexene-1 copolymer APAO with a hexene-1 content of about 10 weight percent, more preferably, about 25 weight percent, much more preferably with about 30 weight percent and most preferably with about 50 weight percent by weight but it can contain up to 90 weight percent.

The butene-1-co-hexene-1 copolymer may be formulated with only butene-1 and hexene-1 monomers in the reactor APAO.

When the formed copolymer is applied, or coated onto a substrate, such as in the form of a hot melt adhesive, or the formed copolymer is cast from an organic solvent solution onto a substrate typically such as stock paper or a plastic film or any other porous or non-porous substrate (the primary substrate) by any of the commercially known and used coating methods, the formed APAO copolymer bonds strongly forming a destructive bond to the primary substrate.

Pressure sensitive applications require good adhesion to a variety of substrates, but such adhesion should be reversible and no adhesive should be transferred to the surface or secondary substrate or substrates onto which the primary substrate coated with the hot melt adhesive (HMA) subject of this invention, may be applied to.

This inventive copolymer exhibits a type of pressure sensitive adhesive (PSA) properties. Such types of pressure sensitive adhesives can be high desirable for removable applications such as removable tapes and labels.

The addition of an "external donor" of organosilicon such as for example cyclohexylmethyldimethoxysilane (CM-DMS), or phenyltriethoxysilane (PES), can impart unique and valuable mechanical advantages to the physical and mechanical properties of the copolymer, physical properties that reflect favorably in the final performance of any hot melt adhesive containing the external donor of organosilicon.

Additives may form a part of the subject HMA.

Useful additives can be polyethylene, maleic anhydride grafted polyethylene, Fischer-Tropsch waxes, paraffinic waxes and metallocene waxes. These, as well as other similar compatible waxes, have the effect of controlling the melt viscosity and also controlling the rate of set of the HMA.

Other useful plasticizer additives might be mineral, paraffinic or naphthenic oils, which can be used in a copolymer based formulation to add such properties as control of melt viscosity, tackiness and controllable open time. Also additional useful additives can be anti-oxidants and UV stabilizers.

Additional compatible polymers can be included in the formulation of the hot melt adhesive (HMA) for example hydrogenated styrene block copolymers of the styrene-ethylene-butadiene-styrene (SEBS) and styrene-ethylene-propylene-styrene (SEPS) type and polyethylenes such as linear low density poly ethylene (LLDPE) of high melt indices, each having a melt index of typically more than 500 dg/min measured at 190 degrees Celsius according to ASTM Test Method D-1238.

Also used, preferable as a minor component, may be metallocene polyethylenes which are known in the art as mPEs and whose composition consists of ethylene copolymerized with such alpha-olefins as 1-butene or 1-hexene or 1-octene. Metallocene polypropylenes (mPP), of an appropriate molecular weight, such as a MFR higher than 100 dg/min, can be used with the subject APAO copolymer, and added as a minor component.

The butene-1-co-hexene-1 copolymer is made at a temperature between about 130 degree F. and about 175 degree F. and at a reactor pressure sufficient to maintain butene-1 in the liquid phase (in the absence of any added solvent), and in the presence of from about 0.7 to about 3.0 mol percent hydrogen based on the monomer feed.

The hydrogen concentration present during the manufacture of the subject copolymers is adjusted so that their melt viscosity, measured at 375 degrees F., according to ASTM Test Method D-3236, is less than 3500 centipoise (cps), preferably less than 3000 centipoise (cps), The butene-1-co-hexene-1 APAOs, which can be made in the absence or presence of externally added organosilicon donor, when used either unformulated or alternatively properly formulated with the above named additives of between 0.1 to about 15 weight percent of the above-mentioned wax(es), or between 0.1 and 25 weight percent of the above mentioned oil(s), will result in hot melt adhesives with enhanced properties for use in pressure-sensitive adhesives, and also in personal hygiene products (e.g. diapers, feminine hygiene, elastic attachment, etc.), in assembly, and other such applications.

The above-named wax and plasticizer additives may interact with the long polymeric chains of the butene-1-co-hexene-1 APAOs made in the presence of the externally added organosilicon in such a way as to result in an HMA with a lower, yet desirable melt viscosity which results in better wetting and penetration of various substrates, porous, or non-porous, resulting in a higher degree of adhesive bonding. Also, the interaction of the multiple components results in a higher yet controllable tackiness for such applications which demand a certain degree of tackiness and pressure sensitive adhesiveness. Other interactions will become obvious to the user.

A hot-melt adhesive according to the invention may comprise: a) an APAO copolymer, preferably made in the presence of an externally added donor; and b) a wax component of the type(s) described above.

A benefit of this invention is that the ABH hot melt adhesive is made without solvents, preventing explosions due to solvents, which makes a work environment safer for workers.

A benefit of this invention is the temperature range needed to formulate this hot melt adhesive. Namely, the benefit is providing a low temperature range of from 275 degrees to 375 degrees Fahrenheit to create an APAO hot melt adhesive which saves on the need to use additional fossil fuels by a facility.

A benefit of this invention is that the lower temperature range for the polymerization of this amorphous hexene-1-containing polyolefin prevents harm to humans in the facility, which might otherwise be fatal, such as third degree burns.

The absence of solvents in the hot melt formulation avoids exposing wildlife to excursions of solvent vapors from the manufacturing plant, keeping the animals around the plant safer, enabling grazing of domestic livestock near the plant that otherwise might be harmful.

Several butene-1-co-hexene-1 copolymerization reactions were carried out either in the absence or in the presence of an external donor. External donors such as phenyltriethoxysilane (PES or A-Donor, CAS No. 780-69-8) or cyclohexylmethyldimethoxysilane (CMDMS or C-Donor, CAS No. 17865-32-6) are typically used. Other silane-based external donors such as diphenyldimethoxysilane (B-Donor, CAS No. 6843-66-9), diisobutyldimethoxysilane (CAS No. 17980-32-4), dicyclopentyldimethoxysilane (DDMS or D-Donor, CAS No. 126990-35-0) and diisopropyldimethoxysilane (DPMS or P-Donor, CAS No. 18230-61-0) can also be used.

The polymerization reactions were carried out in an Autoclave Engineers 1-L autoclave at typically 70 C and for one hour. Other polymerization reaction temperatures as low as 40 C and as high as 90 C can also be used. Reaction times can also range from 5 minutes to as long as three hours. The reactions are ran in the absence of any added organic solvent because the liquefied monomers butene-1, and hexene-1, serve to a) remove the high exothermal heat of polymerization reaction, and b) to serve as the suspension medium for the formed polymeric products. The butene-1 monomer used is high purity plant butene-1 or it can be what is called bottled, in small tanks, butene-1, with purities typically over 99+%. The hexene-1 used in our reactions is high purity (>97%) from vendors such as Sigma-Aldrich.

The polymerization reactions are carried out in the presence of a catalyst system, as described in for example U.S. Pat. Nos. 5,681,913, 5,637,665, and 5,714,554, incorporated herein as examples, comprising: (a) a solid supported catalyst component of the Ziegler-Natta type, (b) a trialkylaluminum co-catalyst, having from 1 to 9 carbon atoms in each alkyl group in an amount such that the Al/Ti ratio may be from 50:1 to 500:1; and (c) an external donor of the type described above.

An embodiment of the hot-melt adjuvant-free APAO formulation includes a butene-1-co-hexene-1 copolymer formed from butene-1 monomer with a supported Ziegler-Natta catalyst, at a process temperature from 130 degrees F. to 175 degrees F. and at a reactor pressure sufficient to maintain the butene-1 monomer in a liquid phase, in the absence of any added solvent, with a hydrogen concentration less than 1 mole percent based on the formed copolymer, with the hydrogen present during the processing of monomers to copolymers sufficient to form a copolymer with a melt viscosity measured at 190 degrees Centigrade which is less than 3500 centipoise.

The 23 formulations of FIGS. 1 and 2 are prepared according to this process.

The hot melt adjuvant free APAO formulation includes a styrenic block copolymer with less than 15 percent styrene, comprising a hydrogenated styrene butadiene block copolymer or a hydrogenated styrene isoprene block copolymer.

The hot melt adjuvant free APAO formulation includes a high melt flow index metallocene with a melt flow above 3500 centipoise (cps) with a melting point of 80 to 100 degrees centigrade.

The hot melt adjuvant free APAO formulation includes a high melt flow rate polypropylene with a melt flow above 18000 centipoise (cps), the high melt flow rate polypropylene comprising a homopolymer or random copolymer of propylene and over 20 percent crystallinity or over 20 percent.

The hot melt adjuvant free APAO formulation includes a low molecular weight polyethylene wax, wherein the molecular weight is less than 1000 centipoise at a temperature of 350 degrees Fahrenheit.

The hot-melt adjuvant-free APAO formulation can include an externally-added organo-silane donor.

The butene-1-co-hexene-1 copolymer formed is less than 20 percent soluble in boiling heptane.

In embodiments, the low molecular weight polyethylene wax can include from 0.1 weight percent to 10 weight percent of paraffin.

In other embodiments, the low molecular weight polyethylene wax can include 0.1 weight percent to 10 weight percent of metallocene wax.

In embodiments, the hydrogen concentration is present during the processing of monomers to copolymers sufficient to form a copolymer with a melt viscosity measured at 190 degrees Centigrade which is less than 3000 centipoise.

In embodiments, the organosilicon comprises a cyclohexyl dimethoxy silane (CMDMS), or a phenyltriethoxysilane (PES).

The organosilicon is added in a concentration of from $5.75 \times 10^{-6}$ to $5.75 \times 10^{-7}$ moles based on the total moles of the butene-1-co-hexene-1 copolymer.

The hot-melt adjuvant-five formulation in embodiment can use a high melt flow rate polypropylene containing 0.1 weight percent to 3 weight percent of a component with polar functionality.

In embodiments, the component with polar functionality can be maleic anhydride.

A different embodiment of the APAO hot-melt adjuvant-free formulation includes a butene-1-co-hexene-1 copolymer formed from butene-1 and hexene-1 monomers with a supported Ziegler-Natta catalyst, at a process temperature from 130 degrees F. to 175 degrees F. and at a reactor pressure sufficient to maintain the butene-1 monomer in a liquid phase, in the absence of any added solvent, with a hydrogen concentration less than 3 mole percent based on the formed copolymer, with the hydrogen concentration present during the processing of monomers to copolymers, sufficient to form a copolymer with a melt viscosity measured at 190 degrees Centigrade which is less than 3500 centipoise.

This APAO hot-melt adjuvant-free formulation is a styrenic block copolymer with less than 15 percent styrene, comprising a hydrogenated styrene butadiene block copolymer or a hydrogenated styrene isoprene block copolymer.

This APAO hot-melt adjuvant-free formulation contains a single-site catalyzed polyethylene with a melting point of from 80 degrees to 100 degrees centigrade.

This APAO hot-melt adjuvant-free formulation has a high melt flow rate polypropylene with a melt flow above 18000 centipoise (cps), wherein the high melt flow rate polypropylene comprises a homopolymer or random copolymer of propylene and over 20 percent crystallinity or over 20 percent isotacticity.

This APAO hot-melt adjuvant-free formulation includes a low molecular weight polyethylene wax, wherein the molecular weight is less than 1000 centipoise at a temperature of 350 degrees Fahrenheit.

The APAO hot-melt adjuvant-free formulation of this embodiment can include an externally-added organosilicon donor.

In embodiments, the butene-1-co-hexene-1 copolymer is less than 20 percent soluble in boding heptane.

In embodiments, the low molecular weight polyethylene wax can include from 0.1 weight percent to 10 weight percent paraffinic wax.

In embodiments, the low molecular weight polyethylene wax can include 0.1 weight percent to 10 weight percent metallocene wax.

The hydrogen concentration present during the processing of monomers to copolymers sufficient to form a copolymer with a melt viscosity measured at 190 degrees Centigrade which is less than 3000 centipoise.

In embodiments, the organosilicon comprises a cyclohexyldimethoxysilane (CMDMS), or a phenyltriethoxysilane (PES).

The organosilicon is added in a concentration of from $5.75 \times 10^{-6}$ to $5.75 \times 10^{-7}$ moles based to the total moles of the butene-1-co-hexene-1 copolymer.

The high melt flow rate polypropylene can contain 0.1 to 3 weight percent of a component with polar functionality.

The component with polar functionality is maleic anhydride.

Now turning to the Figures, FIG. 1 depicts a table containing examples 1 through 23 of the formulation. The table shows a total of 23 polymerization reactions that were an varying the amounts of monomers, external donor, as represented by the F2/F3 ratio, or the alkyl aluminum to donor ratio, and the hydrogen pressure to control the melt viscosity or molecular weight of the produced polymers.

Example 1

A calculated amount of catalyst, cocatalyst and external donor, e.g. PES (targeting a F2/F3 of 250) is added to a 1-L autoclave, properly conditioned, which is loaded with 375 ml of butene-1 and 325 ml of hexene-1 and with 85 psi of hydrogen overpressure. The 1-L autoclave is from AUTOCLAVE ENGINEERS™ (Parker Autoclave Engineers, Erie, Pa.).

The reaction is started and maintained at a temperature of 70 degrees Celsius. After an hour, the polymerization reaction is stopped. Unreacted monomers are vented and a soft solid product is recovered. The properties are described in Table 2 and according to a test commonly used in the pressure sensitive industry, the RET of 4.0+/−0.5 cm gives this example PSA properties.

Example 4

For example 4, the same procedure as described in example 1 is employed, targeting a F2/F3 of 400, but adding 500 of butene-1, 200 ml of hexene-1 and 120 psi of hydrogen. The reaction is started and the reaction temperature is maintained at 70 degrees Celsius. After one hour, the reaction is stopped. Unreacted monomers are vented and a lower melt viscosity solid than example 1 is recovered. A RET of 2.1+/−0.2 cm gives this example PSA properties.

Table 2 shows the results of the physical and mechanical characterization of the polymerization products produced in FIG. 1.

The butene-1-co-hexene-1 based copolymers, described herein, are characterized by the PSTC (Pressure Sensitive Tape Council) rolling ball tack (RET) test method 6 and Holding Power (H/P), PSTC test method 107.

It should be noted that a primary use of the hot melt adhesive formulation is as a pressure sensitive adhesive (PSA).

Additional Example 24

The APAO hot melt adhesive includes a formulation of 54 weight percent a butene-1-co-hexene-1 copolymer formed from butene-1 monomer with a supported Ziegler-Natta catalyst at a process temperature from 130 degrees Fahrenheit to 175 degrees Fahrenheit and at a reactor pressure sufficient to maintain the butene-1 monomer in a liquid phase, in the absence of any added solvent, with a hydrogen concentration less than 1 mole percent based on the formed copolymer with the hydrogen present during the processing of monomers to copolymers sufficient to form a copolymer with a melt viscosity measured at 190 degrees Centigrade which is less than 3500 centipoise.

The APAO hot melt adhesive includes a formulation of 10 weight percent of a styrenic block copolymer with less than 15 percent styrene, which can include a hydrogenated styrene butadiene block copolymer.

The APAO hot melt adhesive includes a formulation of 15 weight percent of a high melt flow index metallocene known as ENGAGE® 8400 from Dow Chemical Company, with a melt flow above 3500 centipoise (cps) with a melting point of 80 degrees to 100 degrees centigrade.

The APAO hot melt adhesive includes a formulation of 10 weight percent of a high melt flow rate polypropylene known as POLYBOND 3000® from Addivant with a melt flow above 18000 centipoise (cps). The high melt flow rate polypropylene includes a homopolymer and over 20 percent crystallinity.

The APAO hot melt adhesive includes a formulation of 6 weight percent of a low molecular weight polyethylene wax, wherein the molecular weight is less than 1000 centipoise at a temperature of 350 degrees Fahrenheit forming an amorphous poly alpha olefin hot melt adhesive.

Example 25

The APAO hot melt adhesive includes a formulation of 47 weight percent a butene-1-co-hexene-1 copolymer formed from butene-1 monomer with a supported Ziegler-Natta catalyst, at a process temperature from 130 degrees Fahrenheit to 175 degrees Fahrenheit and at a reactor pressure sufficient to maintain the butene-1 monomer in a liquid phase, in the absence of any added solvent, with a hydrogen concentration less than 1 mole percent based on the formed copolymer, with the hydrogen concentration present during the processing of monomers to copolymers sufficient to form a copolymer with a melt viscosity measured at 190 degrees Centigrade which is less than 3500 centipoise.

The APAO hot melt adhesive includes a formulation of 11 weight percent a styrenic block copolymer with less than 15 percent styrene, comprising a hydrogenated styrene isoprene block copolymer.

The APAO hot melt adhesive includes a formulation of 3 weight percent a single-site catalyzed polyethylene with a melting point of 80 to 100 degrees centigrade.

The APAO hot melt adhesive includes a formulation of 10 weight percent of a high melt flow rate polypropylene with a melt flow above 18,000 centipoise (cps), the high melt flow rate polypropylene comprising a random copolymer of propylene and over 20 percent isotacticity.

The APAO hot melt adhesive includes a formulation of 10 weight percent of a low molecular weight polyethylene wax, wherein the molecular weight is less than 1000 centipoise at a temperature of 350 degrees Fahrenheit forming an amorphous poly alpha olefin hot melt adhesive.

While these embodiments have been described with emphasis on the embodiments, it should be understood that within the scope of the appended claims, the embodiments might be practiced other than as specifically described herein.

What is claimed is:

1. A hot-melt formulation consisting of:
   a. a butene-1-co-hexene-1 copolymer formed from butene-1 and hexene-1 monomers with a supported Ziegler-Natta catalyst at a process temperature from 130 degrees F. to 175 degrees F. and at a reactor pressure sufficient to maintain the butene-1 monomer in a liquid phase, in absence of any added solvent, with a hydrogen concentration less than 1 mole percent based on the formed copolymer, with the hydrogen present during a processing of monomers to copolymers sufficient to form a copolymer with a melt viscosity measured at 190 degrees Celsius which is less than 3500 centipoise;
   b. a styrenic block copolymer with less than 15 percent styrene, consisting of a hydrogenated styrene butadiene block copolymer or a hydrogenated styrene isoprene block copolymer;
   c. a metallocene polyethylene, which consists of ethylene copolymerized with 1-butene, 1-hexene or 1-octene, with a melt above 3500 cps 100 degrees centigrade;
   d. a polypropylene with a melt above 18000 centipoise as measured at 100 degrees centigrade, the polypropylene, consisting of a homopolymer or random copolymer of propylene and over 20 percent crystallinity or over 20 percent isotacticity; and
   e. a low molecular weight polyethylene wax, wherein the melt viscosity is less than 1000 centipoise at a temperature of 350 degrees Fahrenheit, and consists of from 0.1 weight percent to 10 weight percent of paraffin, forming an amorphous poly alpha olefin hot melt adhesive.

2. The hot-melt formulation of claim 1 further consisting of an externally-added organosilicon donor.

3. The hot-melt formulation of claim 1, wherein the butene-1-co-hexene-1 copolymer is less than 20 percent soluble in boiling heptane.

4. The hot-melt formulation of claim 1, wherein the hydrogen concentration is present during the processing of monomers to copolymers sufficient to form a copolymer with a melt viscosity measured at 190 degrees Celsius which is less than 3000 centipoise.

5. The hot-melt formulation of claim 2, wherein the organosilicon consists of a cyclohexyldimethoxysilane (CMDMS), or a phenyltriethoxysilane (PES).

6. The hot-melt formulation of claim 2, wherein the organosilicon is from $5.75\times10^{-6}$ to $5.75\times10^{-7}$ moles based to the total moles of the butene-1-co-hexene-1 copolymer.

7. The hot-melt formulation of claim 1, wherein the polypropylene contains from 0.1 weight percent to 3 weight percent of a component with polar functionality.

8. The hot-melt formulation of claim 7, wherein the component with the polar functionality is maleic anhydride.

9. A hot-melt formulation consisting of:
   a. a butene-1-co-hexene-1 copolymer formed from butene-1 monomer with a supported Ziegler-Natta catalyst, at a process temperature from 130 degrees Fahrenheit to 175 degrees Fahrenheit and at a reactor pressure sufficient to maintain the butene-1 monomer in a liquid phase, in absence of any added solvent, with a hydrogen concentration less than 1 mole percent based on the formed copolymer, with the hydrogen concentration present during a processing of monomers to copolymers sufficient to form a copolymer with a melt viscosity measured at 190 degrees Celsius which is less than 3500 centipoise;
   b. a styrenic block copolymer with less than 15 percent styrene, consisting of a hydrogenated styrene butadiene block copolymer or a hydrogenated styrene isoprene block copolymer;
   c. a single-site catalyzed polyethylene, which consists of ethylene copolymerized with 1-butene, 1-hexene or 1-octene, with a melting point of from 80 degrees to 100 degrees centigrade;
   d. a polypropylene with a melt viscosity above 18000 centipoise, the high polypropylene, consisting of a homopolymer or random copolymer of propylene and over 20 percent crystallinity or over 20 percent isotacticity; and
   e. a low molecular weight polyethylene wax, wherein the molecular weight is less than 1000 centipoise at a temperature of 350 degrees Fahrenheit, and consists of from 0.1 weight percent to 10 weight percent of paraffin, forming an amorphous poly alpha olefin hot melt adhesive.

10. The hot-melt formulation of claim 9, further consisting of an externally-added organo-silane donor.

11. The hot-melt formulation of claim 9, wherein the butene-1-co-hexene-1 copolymer is less than 20 percent soluble in boiling heptane.

12. The hot-melt formulation of claim 9, wherein the hydrogen concentration present during the processing of monomers to copolymers sufficient to form a copolymer with a melt viscosity measured at 190 degrees Celsius which is less than 3000 centipoise.

13. The hot-melt formulation of claim 10, wherein the organosilicon consists of: a cyclohexyldimethoxysilane (CMDMS), or a phenyltriethoxysilane (PES).

14. The hot-melt formulation of claim 10, wherein the organosilicon is from $5.75\times10^{-6}$ to $5.75\times10^{-7}$ moles based to the total moles of the butene-1-co-hexene-1 copolymer.

15. The hot-melt formulation of claim 9, wherein the polypropylene contains from 0.1 weight percent to 3 weight percent of a component with polar functionality.

16. The hot-melt formulation of claim 15, wherein the component with polar functionality is maleic anhydride.

* * * * *